US012666134B2

(12) United States Patent
Inazawa

(10) Patent No.: US 12,666,134 B2
(45) Date of Patent: Jun. 23, 2026

(54) CONTROL APPARATUS, METHOD OF CONTROLLING THE SAME, AND STORAGE MEDIUM

(71) Applicant: CANON KABUSHIKI KAISHA, Tokyo (JP)

(72) Inventor: Keisuke Inazawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 78 days.

(21) Appl. No.: 18/765,780

(22) Filed: Jul. 8, 2024

(65) Prior Publication Data

US 2025/0030937 A1     Jan. 23, 2025

(30) Foreign Application Priority Data

Jul. 20, 2023     (JP) ................................. 2023-118519

(51) Int. Cl.
| H04N 23/63 | (2023.01) |
| H04N 7/18 | (2006.01) |
| H04N 23/62 | (2023.01) |
| H04N 23/661 | (2023.01) |

(52) U.S. Cl.
CPC ........... *H04N 23/632* (2023.01); *H04N 7/181* (2013.01)

(58) Field of Classification Search
CPC ...... H04N 23/632; H04N 7/181; H04N 23/62; H04N 23/63; H04N 23/661
See application file for complete search history.

(56) References Cited

U.S. PATENT DOCUMENTS

| | | | | |
|---|---|---|---|---|
| 2011/0109751 | A1* | 5/2011 | Chang .................. | H04N 23/632 |
| | | | | 348/207.1 |
| 2023/0308743 | A1* | 9/2023 | Ku .......................... | H04M 1/02 |

FOREIGN PATENT DOCUMENTS

JP            2014236245 A     12/2014

* cited by examiner

*Primary Examiner* — Ahmed A Berhan
(74) *Attorney, Agent, or Firm* — Cowan, Liebowitz & Latman, P.C.

(57)            ABSTRACT

A control apparatus includes an acquisition unit configured to acquire data from an external apparatus via a communication unit, and a generation unit configured to, based on the data acquired by the acquisition unit, generate a display screen including operation information which is information for operating the external apparatus, wherein the generation unit, based on whether a live view image is included in the data acquired by the acquisition unit, adjusts a display region for the operation information in the display screen.

15 Claims, 9 Drawing Sheets

Figure 2:
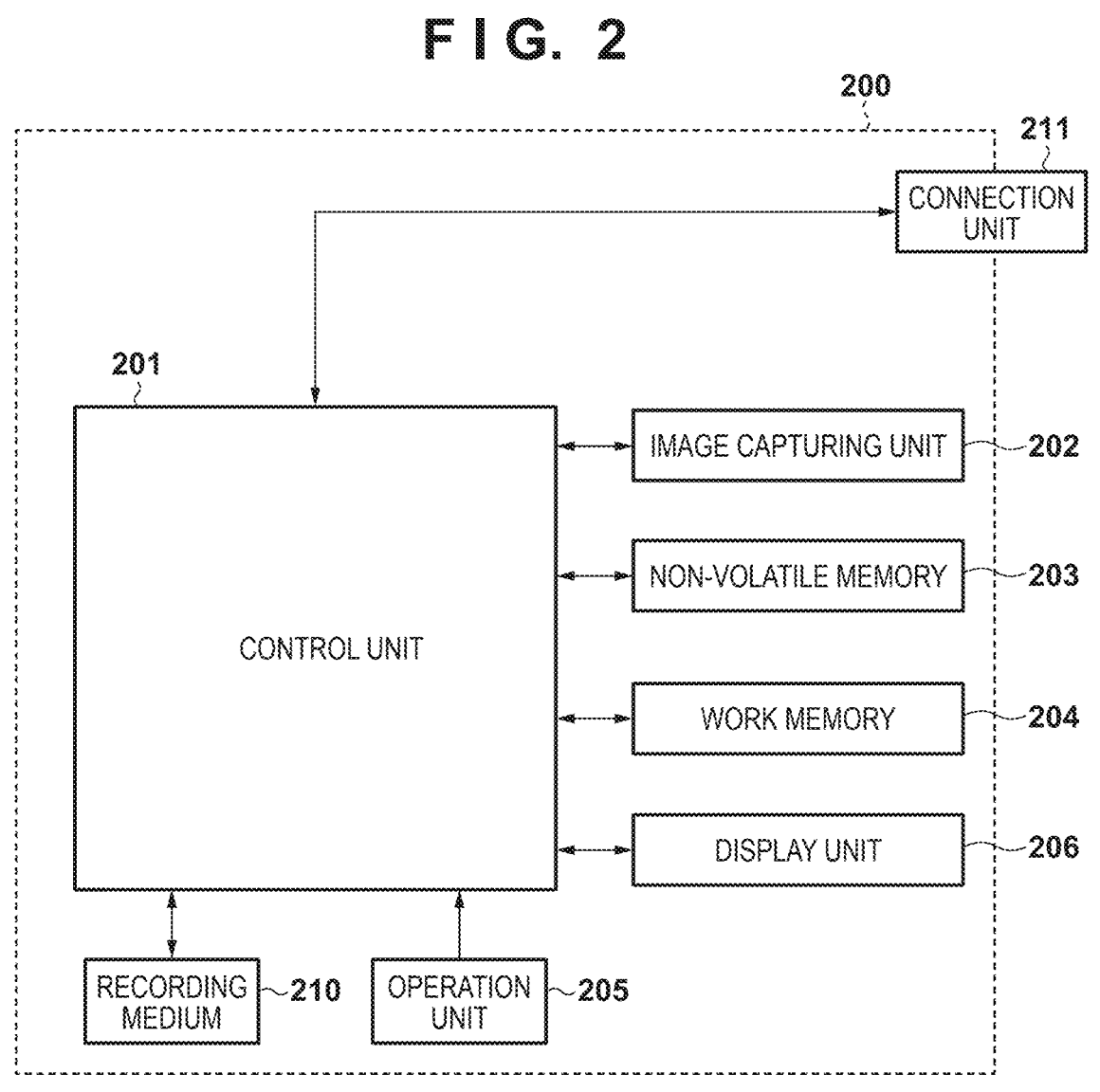

CONNECTION UNIT

201

CONTROL UNIT

IMAGE CAPTURING UNIT — 202

NON-VOLATILE MEMORY — 203

WORK MEMORY — 204

DISPLAY UNIT — 206

RECORDING MEDIUM — 210

OPERATION UNIT — 205

FIG. 3

F I G.  5B
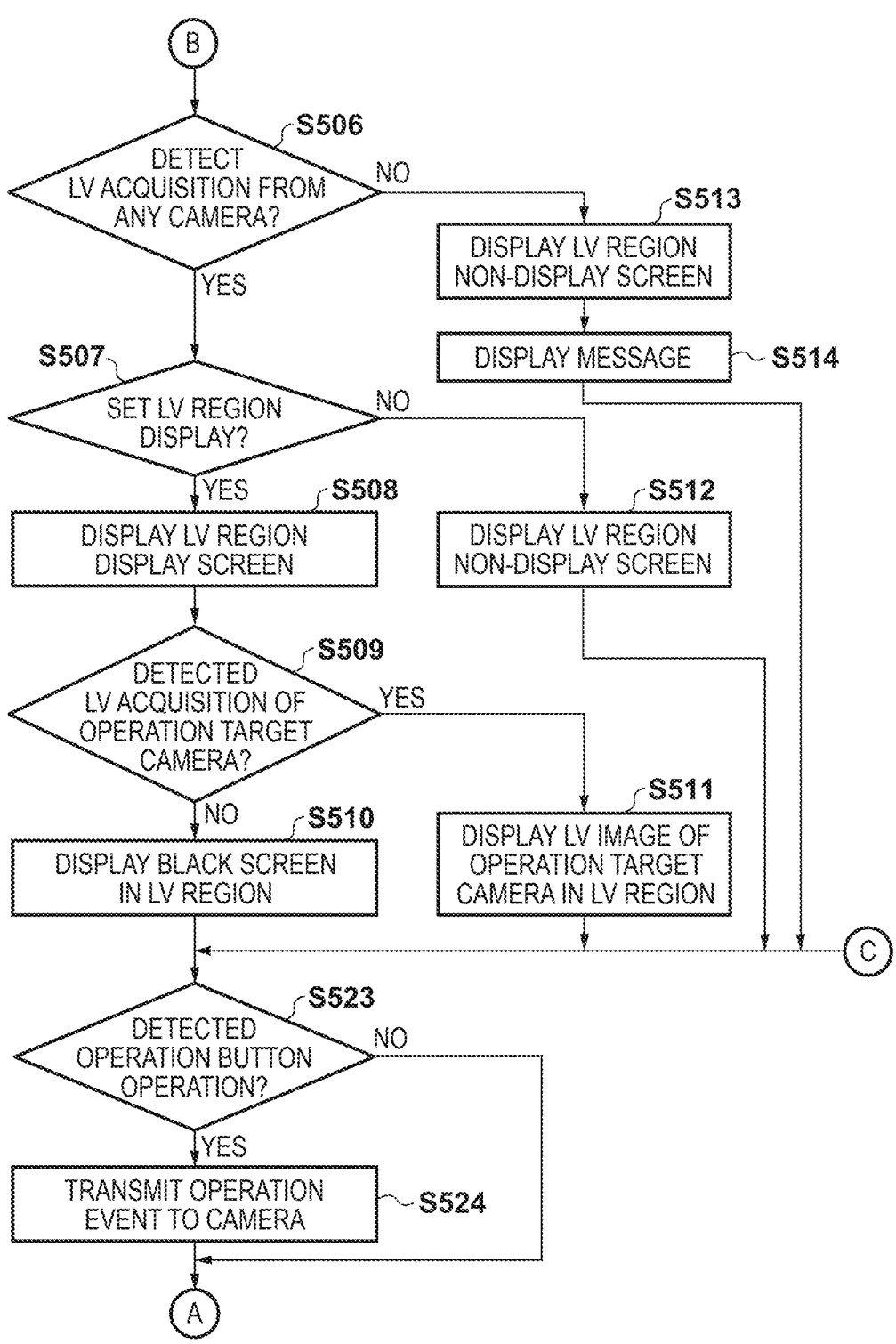

F I G. 7
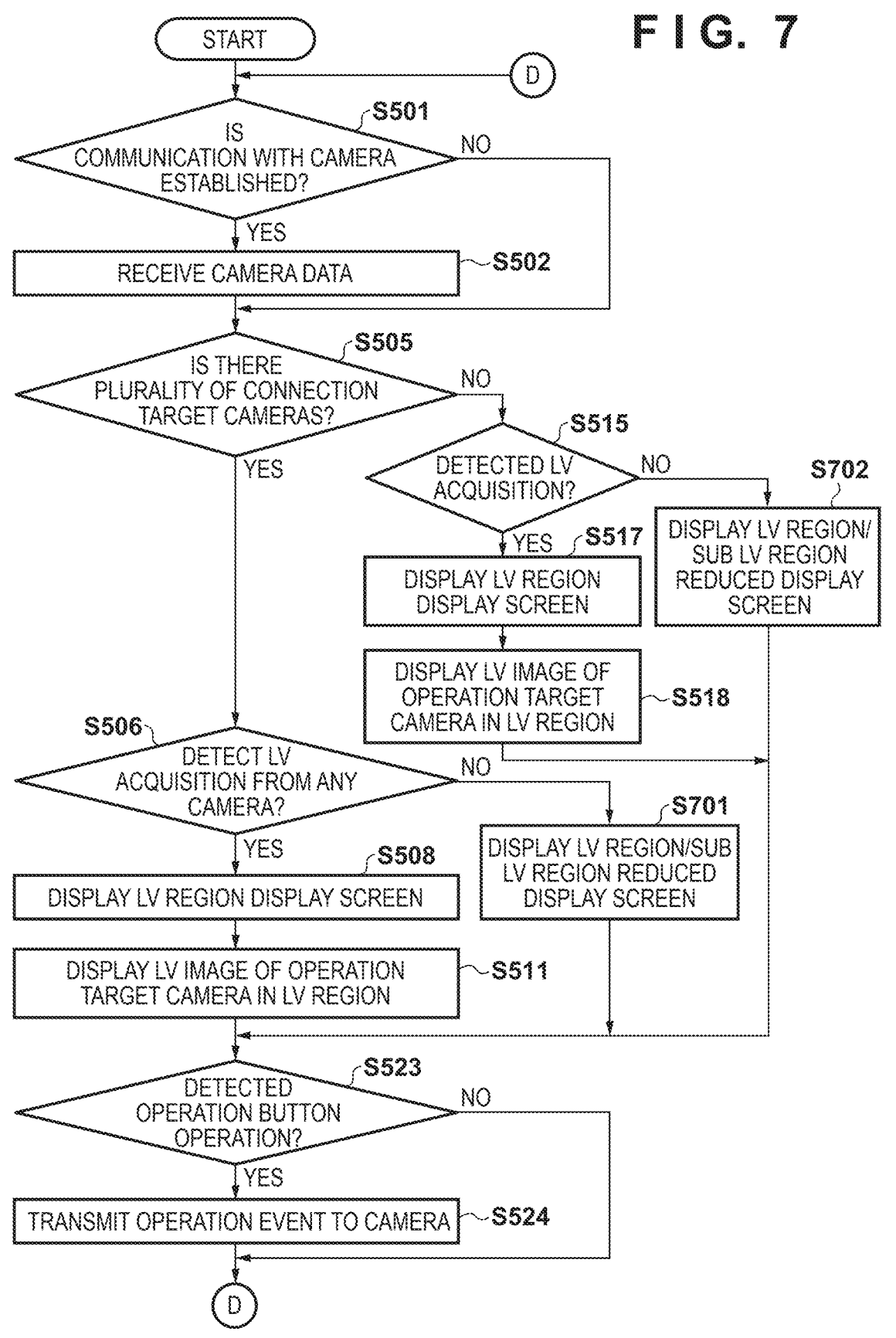

CONTROL APPARATUS, METHOD OF CONTROLLING THE SAME, AND STORAGE MEDIUM

BACKGROUND OF THE INVENTION

Field of the Invention

The present invention relates to a control apparatus that performs communication with an external apparatus.

Description of the Related Art

There is application software that can wirelessly connect to a camera and remotely operate the camera. Such application software runs on remote terminals, such as smart phones, tablet devices, PCs, and the like, allowing the user to remotely operate the camera.

Some such application software can acquire a live view image (hereinafter referred to as an LV image) of a camera and display it on a screen on a remote terminal.

Japanese Patent Laid-Open No. 2014-236245 discloses a technique for confirming in advance how a screen will change according to changes in camera image acquisition conditions. In this technique, when the remote terminal receives a request to change a camera image acquisition condition from the user, before the camera is able to acquire images under the acquisition condition for which the change request was made, images from the camera are modified and then displayed. Then, after the camera has acquired images under the acquisition condition for which the change request was made, the images received from the camera are displayed.

Incidentally, in application software capable of remote operation as described above, a screen configuration in which LV images and operation components are simultaneously displayed on a screen on a remote terminal may be adopted. This allows the user to remotely operate the camera while confirming LV images.

However, there is a problem in that when LV images cannot be acquired from a camera and LV images cannot be displayed, the LV image display region is unnecessary.

By the technique described in Japanese Patent Laid-Open No. 2014-236245, it is possible to confirm in advance how an image will change in accordance with a change in image acquisition conditions; however, there is no mention of problems that occur when LV images cannot be acquired from the camera.

SUMMARY OF THE INVENTION

The present disclosure has been made in view of the above-described problems, and provides a control apparatus capable of effectively utilizing a display screen when LV images cannot be acquired from an external apparatus.

According to a first aspect of the present invention, there is provided a control apparatus, comprising at least one processor or circuit configured to function as: an acquisition unit configured to acquire data from an external apparatus via a communication unit; and a generation unit configured to, based on the data acquired by the acquisition unit, generate a display screen including operation information which is information for operating the external apparatus, wherein the generation unit, based on whether a live view image is included in the data acquired by the acquisition unit, adjusts a display region for the operation information in the display screen.

According to a second aspect of the present invention, there is provided a method of controlling a control apparatus, the method comprising: acquiring data from an external apparatus via a communication unit; and based on the acquired data, generating a display screen including operation information which is information for operating the external apparatus, wherein in the generating the display screen, based on whether a live view image is included in the acquired data, a display region for the operation information in the display screen is adjusted.

Further features of the present invention will become apparent from the following description of exemplary embodiments with reference to the attached drawings.

BRIEF DESCRIPTION OF THE DRAWINGS

FIG. 2 is a block diagram illustrating a configuration of a camera.

FIG. 3 is a block diagram illustrating a configuration of a control apparatus.

FIGS. 5A and 5B are flowcharts illustrating operation of the control apparatus in the first embodiment.

FIG. 7 is a flowchart illustrating operation of the control apparatus in a second embodiment.

DESCRIPTION OF THE EMBODIMENTS

Figure 1:
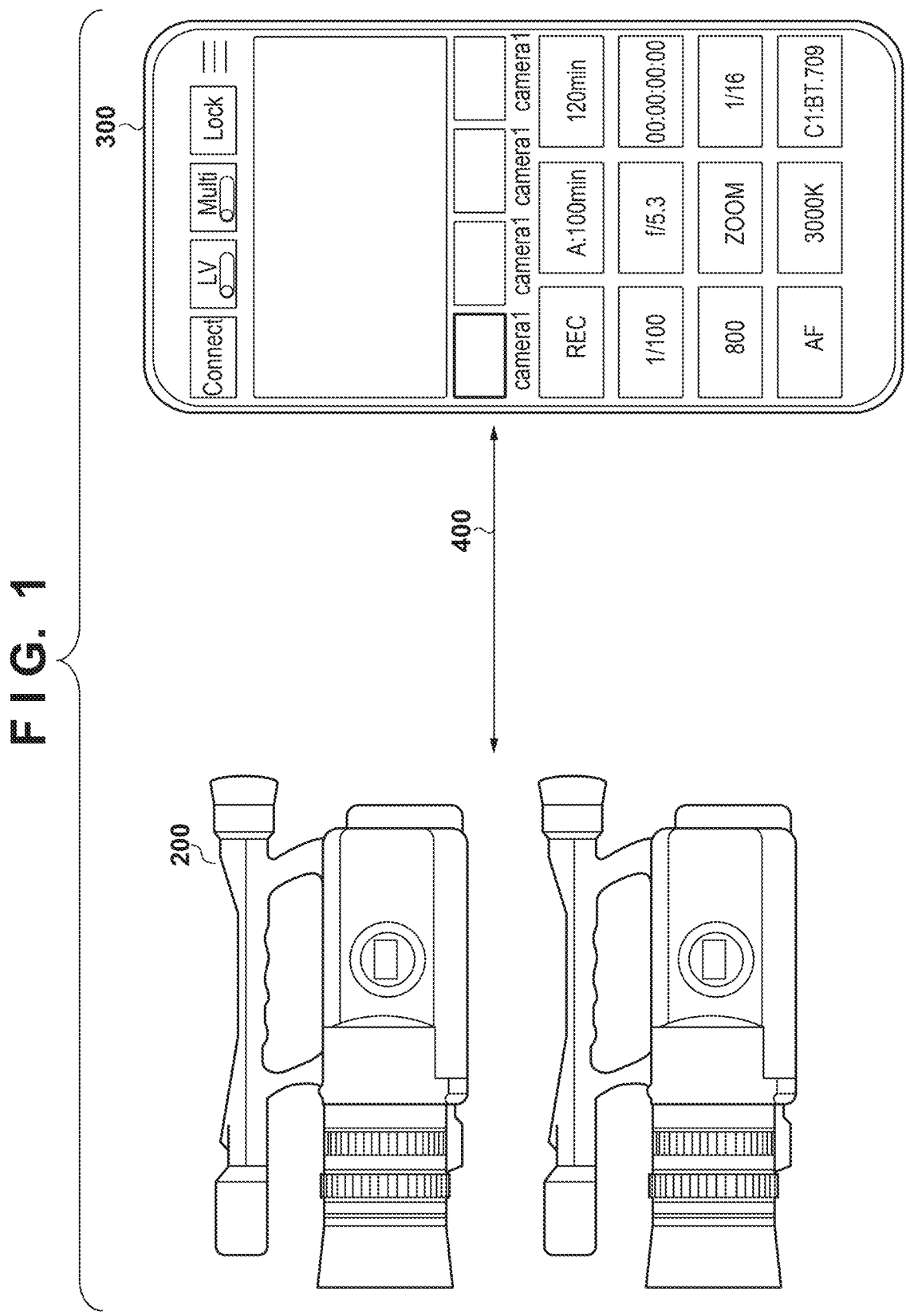
FIG. 1 is a view illustrating a system configuration of a communication system of a first embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

<System Configuration>

FIG. 1 is a view illustrating a system configuration of a communication system of a first embodiment of the present invention. FIG. 1 illustrates that a plurality of cameras 200 that are external apparatuses and a control apparatus 300 are connected by a communication 400 so as to be able to communicate. In the present embodiment, for example, a mobile phone is used as the control apparatus 300.

In FIG. 1, the plurality of cameras 200 are cameras that are made to be connection targets by the control apparatus 300. The communication 400 employs Wi-Fi (registered trademark) in the present embodiment, but is not limited thereto. For example, Bluetooth (registered trademark) or a proprietary wireless communication method may be used instead. Alternatively, wired communication may be used instead of the wireless communication. Specifically, any wired communication method, such as RS-232C or RS-422A or USB or Ethernet (registered trademark), can be used in the present embodiment. However, there is a need for a system capable of transmitting and receiving video and camera setting values.

<Camera Configuration>

FIG. 2 is a block diagram illustrating a configuration example of the cameras 200 according to the present embodiment. Although a case where a camera 200 is connected to the control apparatus 300 will be described here, the external apparatus connected to the control apparatus 300 is not limited to being a camera. For example, an information processing apparatus such as a tablet device or a personal computer may be connected to the control apparatus 300 as an external apparatus.

In FIG. 2, a control unit 201 controls each unit of the camera 200 according to an inputted signal or a program to be described later. Instead of the control unit 201 controlling the entire camera 200, the entire camera 200 may be controlled by a plurality of pieces of hardware across which the processing is distributed.

An image capturing unit 202 converts subject light formed into an image by a lens included in the image capturing unit 202 into an electrical signal, performs noise reduction processing or the like thereon, and outputs the processed signal as digital image data. After image data obtained by image capturing is stored in a buffer memory, the image data is subjected to predetermined arithmetic processing by the control unit 201, and recorded in a recording medium 210.

A non-volatile memory 203 is a non-volatile memory that can be electrically erased/recorded, and stores later-described programs to be executed by the control unit 201.

A work memory 204 is used as a buffer memory that temporarily holds image data captured by the image capturing unit 202, an image display memory of a display unit 206, a work region of the control unit 201, and the like.

An operation unit 205 is used to receive an instruction to the camera 200 from the user. The operation unit 205 includes, for example, an operation component such as a power button for the user to instruct that power of the camera 200 be turned on or off, a release switch for instructing an image capture, and a reproduction button for instructing reproduction of image data. The operation unit 205 also includes a touch panel disposed on the display unit 206 described later.

The release switch includes a switch SW1 and a switch SW2. When the release switch enters a so-called "half-press" state, the switch SW1 is turned on. As a result, shooting preparation processing such as auto-focus (AF) processing, auto-exposure (AE) processing, auto-white balance (AWB) processing, and electronic flash preliminary emission (EF) processing is executed. When the release switch enters a so-called "full-press" state, the switch SW2 is turned on. As a result, the image capturing process is executed.

The display unit 206 displays a viewfinder image of the time of shooting, displays captured image data, displays text for interactive operation, and the like. Note that the display unit 206 does not necessarily have to be incorporated in the camera 200. The camera 200 may be connected to an internal or external display unit 206, and may have at least a display control function for controlling display of the display unit 206.

The recording medium 210 can record the image data outputted from the image capturing unit 202. The recording medium 210 may be configured to be detachable from the camera 200 or may be built into the camera 200. That is, the camera 200 may have at least a means for accessing the recording medium 210.

A connection unit 211 is an interface for connecting to an external apparatus. The camera 200 of the present embodiment can exchange data with an external apparatus via the connection unit 211. In the present embodiment, the connection unit 211 includes an interface for communicating with an external apparatus over a wireless LAN. The control unit 201 can perform wireless communication with an external apparatus by controlling the connection unit 211. Note that the communication method is not limited to a wireless LAN.

Note that the camera 200 according to the present embodiment can operate as a slave apparatus in an infrastructure mode of wireless LAN communication. When operating as a slave apparatus, the camera 200 can join a network formed by a peripheral access point (hereinafter referred to as the AP) by connecting to the AP. In addition, although the camera 200 according to the present embodiment is a kind of AP, it can also operate as a simple AP (hereinafter referred to as the simple AP) having a more limited function. The AP in the present embodiment is an example of a relay apparatus.

When the camera 200 operates as a simple AP, the camera 200 forms its own network. Apparatuses in the periphery of the camera 200 can recognize the camera 200 as an AP and join the network formed by the camera 200. It is assumed that a program for operating the camera 200 as described above is stored in the non-volatile memory 203.

While the camera 200 in the present embodiment is a type of AP, it is a simple AP that does not have a gateway function for transferring data received from a slave apparatus to an Internet provider or the like. Therefore, even if data is received from another apparatus in the network formed by the device itself, the data cannot be transferred to a network such as the Internet. Alternatively, the connection unit 211 may be a wired communication interface instead of wireless communication. Specifically, a wired communication interface such as RS-232C or RS-422A or USB or Ethernet (registered trademark) may be employed, regardless of the communication method.

The camera 200 has been described above. Next, the control apparatus 300, which is an example of an external apparatus, will be described.

<Configuration of Control Apparatus>

Figure 3:
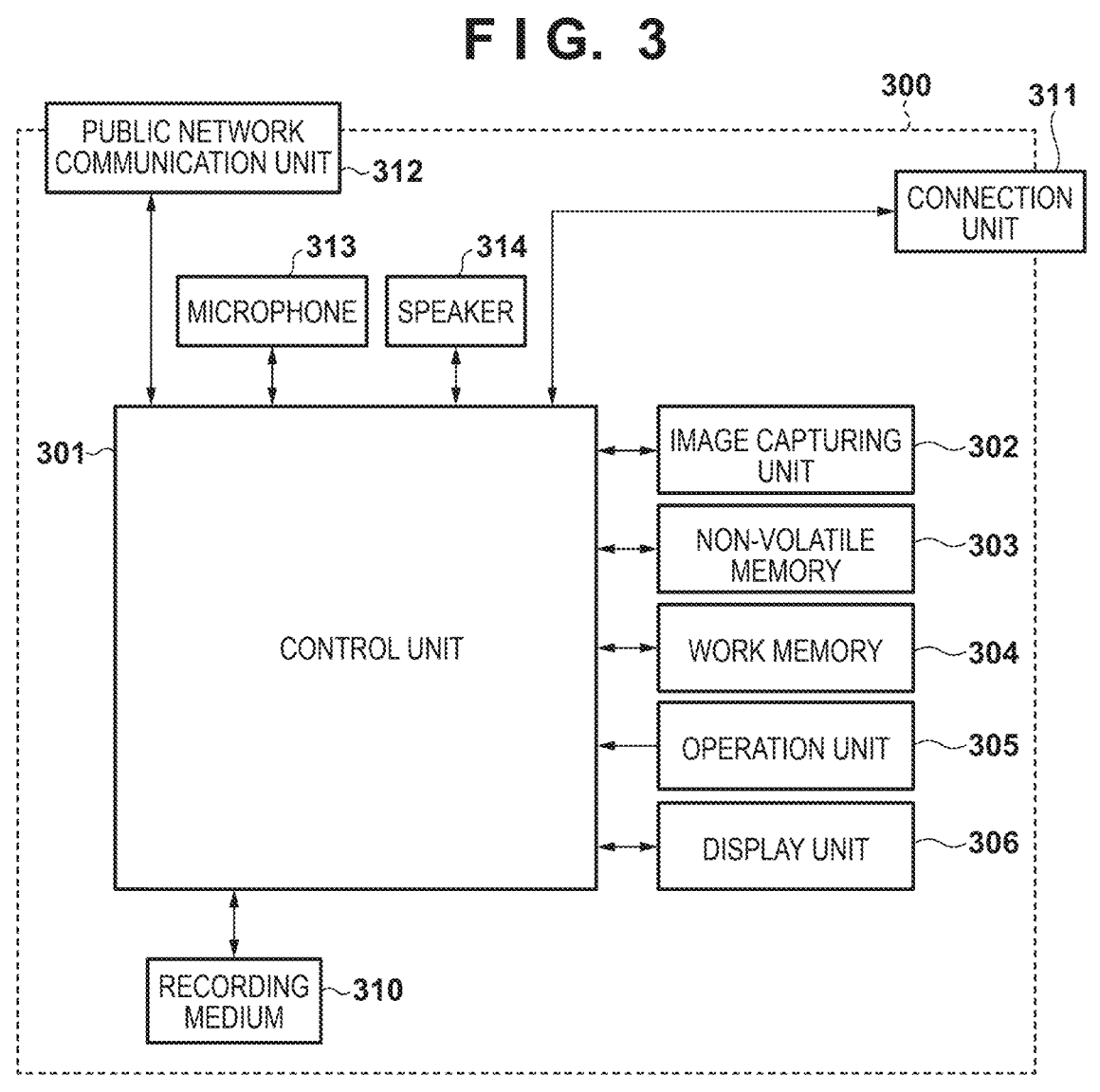

FIG. 3 is a block diagram illustrating a configuration example of the control apparatus 300 according to the present embodiment. Here, a mobile phone will be described as an example of the control apparatus 300, but the control apparatus 300 is not limited to this. For example, the control apparatus 300 may be an information processing apparatus such as a digital camera with a wireless function, a portable media player, a so-called tablet device, a personal computer, or a smartphone.

In FIG. 3, a control unit 301 controls each unit of the control apparatus 300 according to an inputted signal or a program to be described later. Instead of the control unit 301 controlling the entire control apparatus 300, the entire control apparatus 300 may be controlled by a plurality of pieces of hardware across which the processing is distributed.

An image capturing unit 302 converts subject light formed into an image by a lens included in the image capturing unit 302 into an electrical signal, performs noise reduction processing or the like thereon, and outputs the processed signal as digital image data. After image data obtained by image capturing is stored in a buffer memory, the image data is subjected to predetermined arithmetic processing by the control unit 301, and recorded in a recording medium 310.

A non-volatile memory 303 is a non-volatile memory that can be electrically erased/recorded, and stores an OS (operating system) that is basic software executed by the control unit 301, various programs, and the like. A program for communicating with the camera 200 is also stored in the non-volatile memory 303 and installed as a camera communication application.

Note that the processing of the control apparatus 300 in the present embodiment is realized by reading a program provided by the camera communication application. It is assumed that the camera communication application has a program for using basic functions of an OS installed in the control apparatus 300 (for example, a wireless LAN function, a Bluetooth function, a function for calling another application, and the like). The camera communication application has a remote shooting function for capturing an image by remotely operating the camera 200 from the control apparatus 300 while viewing live view images obtained from the camera 200 on the control apparatus 300. Further, the camera communication application has a function of browsing image data recorded in a recording medium attached to the camera 200 by remote operation, and a remote browsing function of receiving the image data. Note that the OS of the control apparatus 300 may have a program for realizing processing according to the present embodiment.

A work memory 304 is used as a buffer memory that temporarily saves image data generated by the image capturing unit 302, an image display memory of a display unit 306, a work region of the control unit 301, and the like.

An operation unit 305 is used to receive an instruction to the control apparatus 300 from the user. The operation unit 305 includes, for example, an operation component such as a power button for the user to instruct that power of the control apparatus 300 be turned on or off, and a touch panel disposed on the display unit 306.

The display unit 306 displays image data, text for interactive operations, and the like. Note that the display unit 306 does not necessarily have to be incorporated in the control apparatus 300. The control apparatus 300 may be connected to the display unit 306, and may have at least a display control function for controlling display of the display unit 306.

The recording medium 310 can record image data outputted from the image capturing unit 302 and image data received from the camera 200. The recording medium 310 may be configured to be detachable from the control apparatus 300 or may be built into the control apparatus 300. That is, the control apparatus 300 may have at least a means for accessing the recording medium 310.

A connection unit 311 is an interface for connecting to an external apparatus. The control apparatus 300 of the present embodiment can exchange data with an external apparatus via the connection unit 311. In the present embodiment, the connection unit 311 includes an interface for communicating with an external apparatus over a wireless LAN. The control unit 301 can perform wireless communication with an external apparatus by controlling the connection unit 311.

Note that the camera 200 according to the present embodiment can at least operate as a slave apparatus in an infrastructure mode of wireless LAN communication, and can join a network that a peripheral AP forms. Further, the camera 200 may operate as a simple AP, and the control apparatus 300 may join the simple AP of the camera 200.

A public network connection unit 312 is an interface used when performing public wireless communication. The control apparatus 300 can make a call or perform data communication with another device via the public network connection unit 312. During a call, the control unit 301 inputs and outputs audio signals via a microphone 313 and a speaker 314.

In the present embodiment, the public network connection unit 312 includes an interface for performing communication using 3G. It should be noted that the present invention is not limited to 3G, and other communication methods such as LTE and WiMAX, ADSL, FTTH, or so-called 4G, may be used. In addition, the connection unit 311 and the public network connection unit 312 do not necessarily have to be configured by independent hardware, and a single antenna may be used for both, for example.

Note that, in the following description, the control apparatus 300 may be described as if it is the subject of processing, but the control unit 301 actually executes a program stored in the non-volatile memory 303 to realize various kinds of processing. As is also the case with parts where the camera 200 is described as the performer of the processing, the control unit 201 executes a program stored in the non-volatile memory 203 to realize various types of processing.

Figure 4:
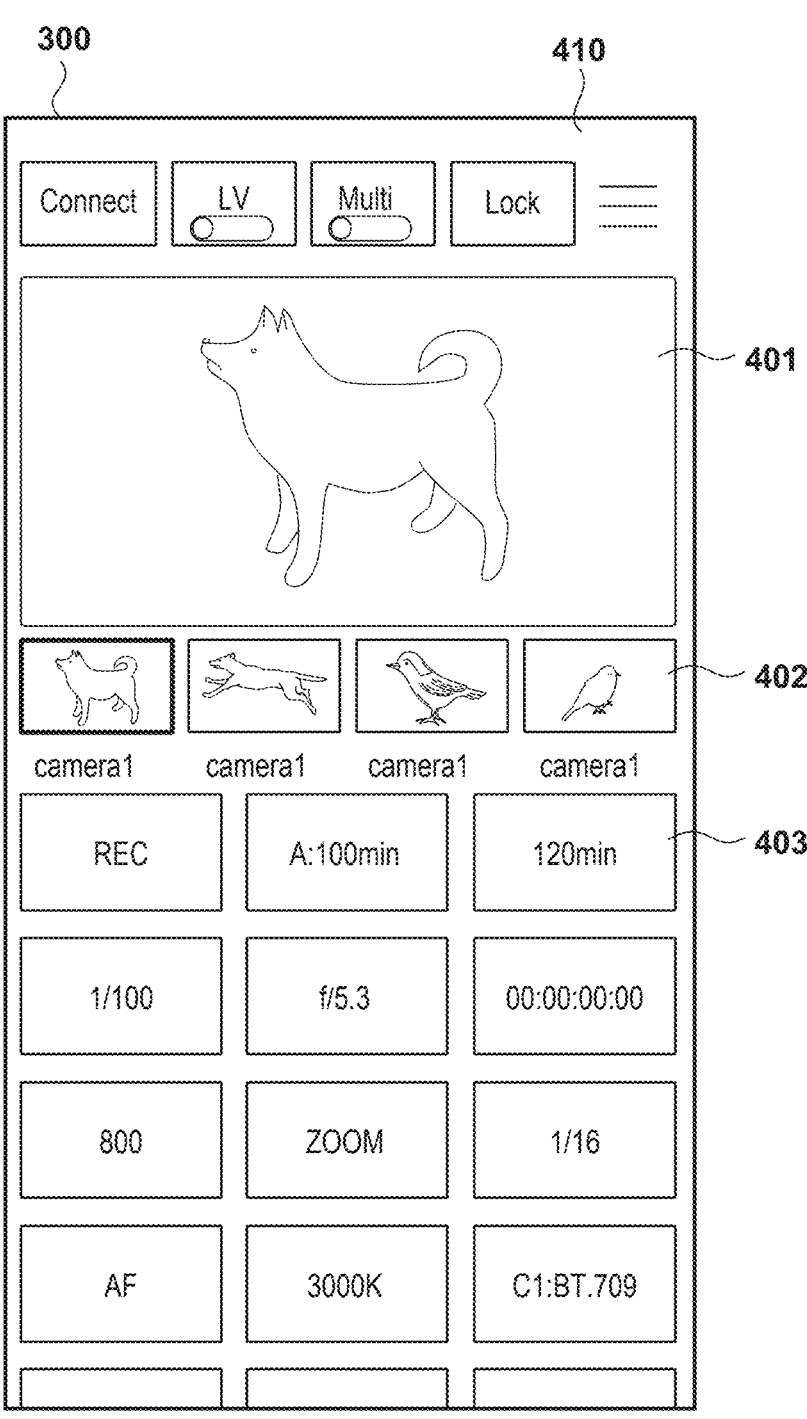
FIG. 4 is a view illustrating an example of a screen of the control apparatus.

FIG. 4 is a diagram illustrating an example of a screen of the camera control application displayed on the display unit 306 by the control apparatus 300. A camera control application 410 according to the present embodiment simultaneously connects a plurality of cameras 200 to the control apparatus 300 and enables operation of the respective cameras. In addition, the camera control application 410 can receive live view images (hereinafter, referred to as LV images) of the cameras and various types of data by communicating with the cameras 200, and displays the received images on the display unit 306. This will be explained using FIG. 4 as follows.

FIG. 4 illustrates an example of a display of a screen of the camera control application. In this example, the control apparatus 300 is connected to the cameras 200 so as to be able to communicate therewith by executing the camera control application 410. The control apparatus 300 receives video captured by the cameras 200 and various current settings of the cameras 200, and displays these on the screen of the display unit 306.

An LV region 401 is a region for displaying an LV image acquired from a camera 200 that is the target of operation among the cameras that are connection targets. A sub LV region 402 is a region for displaying video acquired from other connection target cameras. In this example, the control apparatus 300 is connected to a plurality of cameras 200 at the same time, and displays LV images of the respective cameras 200 side by side in the sub LV region 402. The user can select the camera 200 to be operated by touching a sub LV image displayed in the sub LV region 402.

An operation region 403 is a region for displaying a group of operation buttons arranged on the screen of the camera control application 410. In this example, various current setting values of the camera 200 received by the camera control application 410 from the camera 200 through communication are displayed on the operation buttons. When a user touches an operation button, the user can execute an operation or transition to a screen on which to make a change and change a setting value on the screen. In addition, the operation region 403 is a scroll region, and by the user performing a scroll operation, operation buttons that do not fit in the region can be displayed and operated.

Figure 5A:
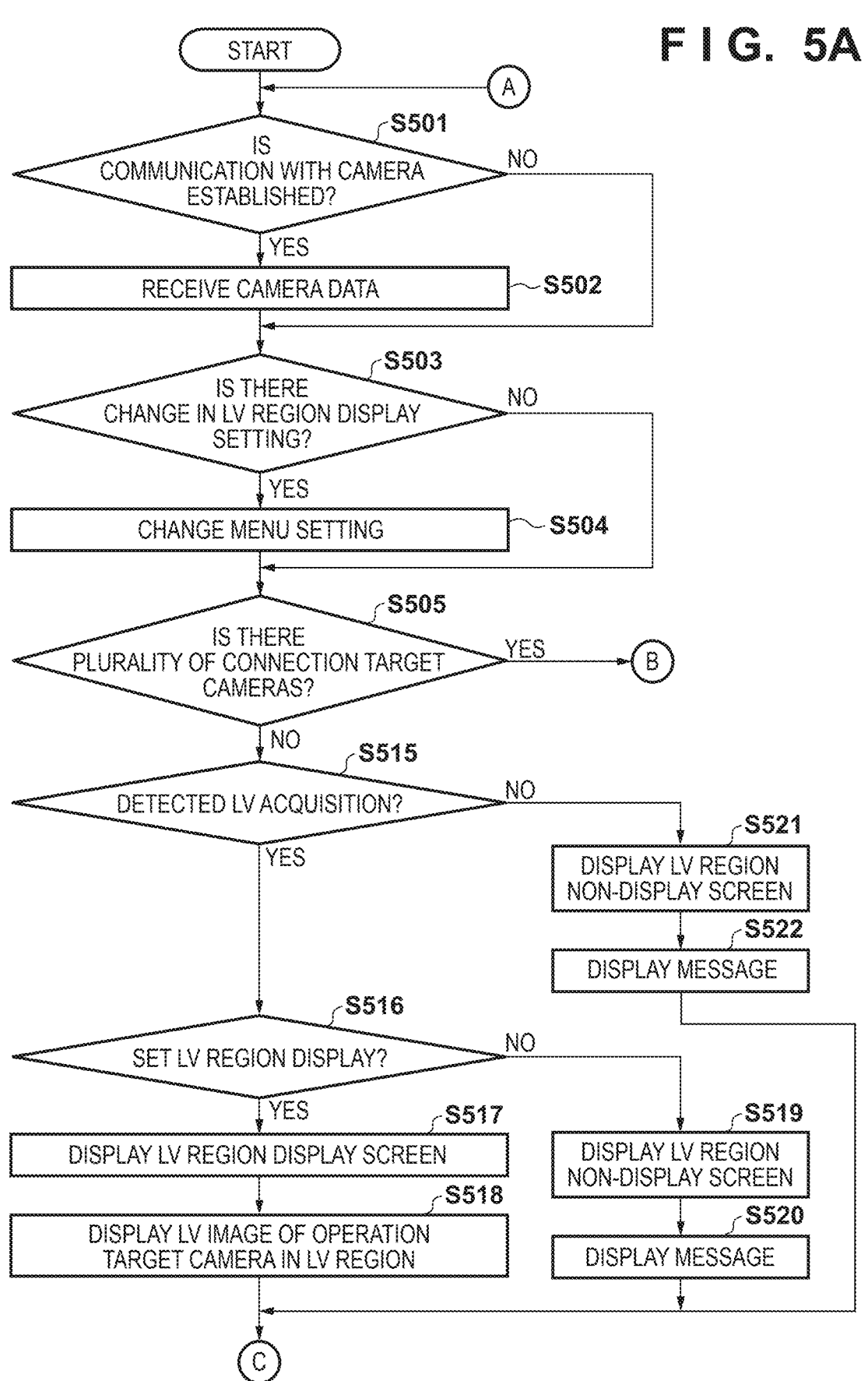

FIGS. 5A and 5B are flowcharts illustrating the overall operation of the control apparatus 300. The operation of the flowcharts of FIGS. 5A and 5B is realized by the control unit 301 loading a program recorded in the non-volatile memory 303 into the work memory 304 and executing the program. Each of the figures in FIGS. 6A to 6C will be described together with the flowcharts of FIGS. 5A and 5B.

In step S501, the control unit 301 determines whether communication with a camera 200 is established via the connection unit 311. If communication is established, the control unit 301 advances the process to step S502; otherwise the control unit 301 advances the process to step S503.

In step S502, the control unit 301 receives data from the camera 200 via the connection unit 311. This data includes a state, capabilities, setting values, and an LV image of the camera 200.

In step S503, the control unit 301 determines whether or not a display setting of the LV region 401 has been changed by a user operation on the display unit 306. In the present embodiment, it is assumed that display and non-display of the LV region can be set as a display setting for the LV region 401. The control unit 301, in a case of a change to the display setting, advances the process to step S504; otherwise the control unit 301 advances the process to step S505.

In step S504, the control unit 301 stores the changed setting content in the work memory 304.

In step S505, the control unit 301 determines whether or not there are a plurality of cameras that are connection targets. In the case where there are a plurality of cameras, the control unit 301 advances the process to step S506; otherwise the control unit 301 advances the process to step S515.

In step S506, the control unit 301 determines whether or not an LV image has been acquired from any camera among the cameras to be connected. Whether or not an LV image has been acquired is determined by the control unit 301 performing the following determination based on the status of communication with the cameras 200 and the data acquired in step S502. If all of the following conditions are met, it is determined that an LV image has been acquired (Yes), otherwise it is determined that they an LV image has not been acquired (No) . . . .

Communication with a camera 200 is established.
The camera 200 is capable of transmitting LV images.
The camera 200 is in a state in which it can transmit LV images.
The control apparatus 300 received an LV image.

In the case of Yes, the control unit 301 advances the process to step S507, and in the case of No, the control unit 301 advances the process to step S513.

In step S507, the control unit 301 reads the display setting of the LV region from the work memory 304, and determines whether the LV region is set to be displayed on non-displayed. If the LV region is set to be displayed, the control unit 301 advances the process to step S508; if the LV region is set to be non-displayed, the control unit 301 advances the process to step S512.

In step S508, the control unit 301 displays a screen in which the LV region 401 is displayed.

In step S509, the control unit 301 determines whether or not an LV image has been acquired from the camera 200 that is the operation target. The determination as to whether or not an LV image has been acquired is performed based on whether or not all the conditions used in the determination of step S506 are met (Yes). The control unit 301, in a case where an LV image has been acquired, advances the process to step S510; otherwise the control unit 301 advances the process to step S511.

Figures 6A, 6B, 6C:
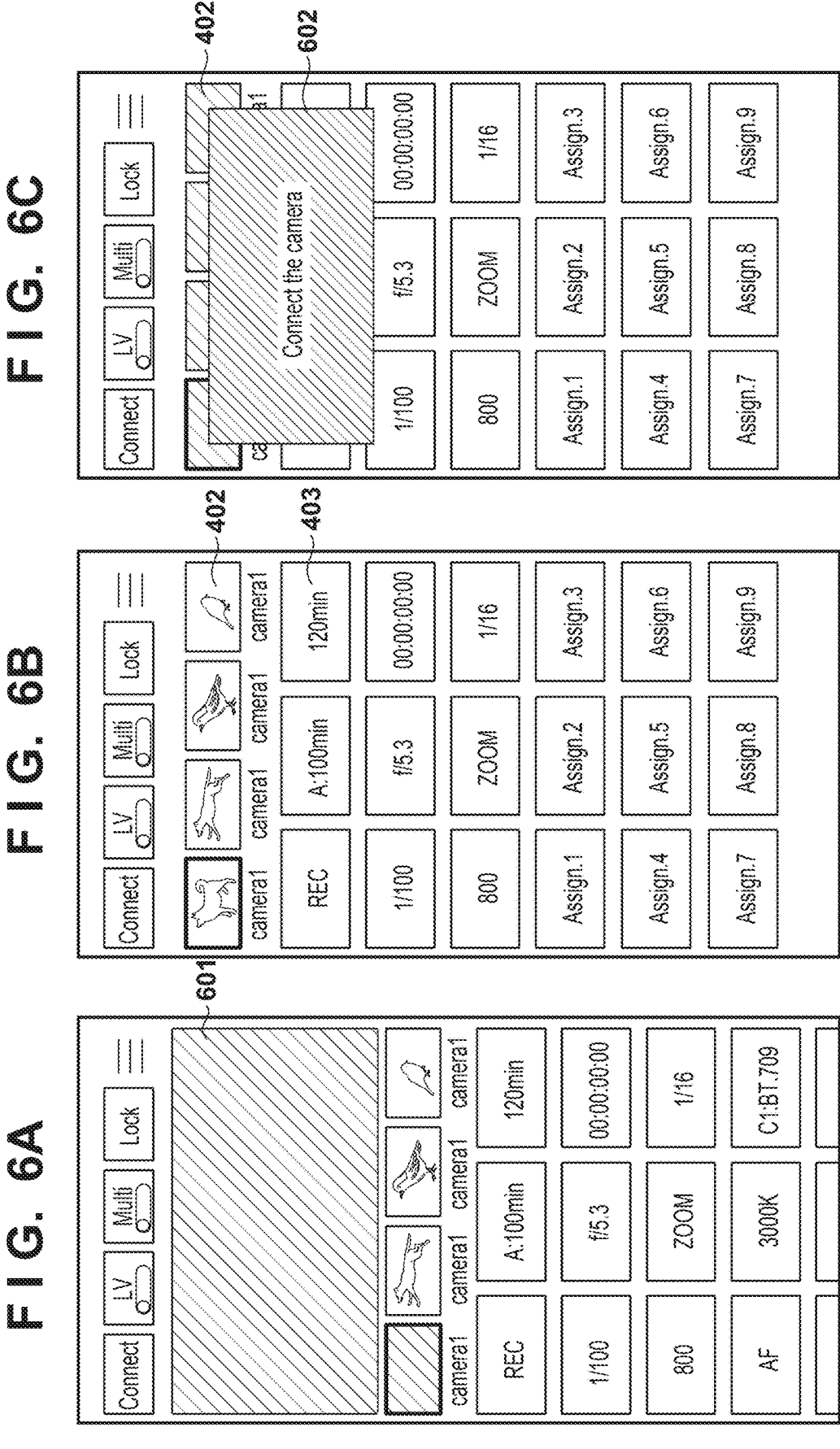
FIGS. 6A to 6C are views illustrating examples of screens of the control apparatus in the first embodiment.

In step S510, the control unit 301 displays a black image 601 indicating that LV image cannot be acquired, which is illustrated in FIG. 6A, in the LV region 401. Thus, even when it is not possible to acquire an LV image from the camera 200 that is the target of operation, it is possible to continue to display the LV region 401. Accordingly, when the user touches a sub LV image to select a camera that is to be the operation target, the user can select the camera without the vertical position of the sub LV image screen changing.

In step S511, the control unit 301 displays an LV image from the camera 200 that is the operation target in the LV region 401.

In step S512, the control unit 301 displays a screen in which the LV region 401 is not displayed as illustrated in FIG. 6B (decreases the LV region 401). In this screen, the LV region 401 is not displayed, and the sub LV region 402 and the operation region 403 are displayed so as to be shifted upward by the size of the LV region 401. As a result, the display area of the operation region 403 can be increased, and the number of operation buttons that can be displayed without scrolling can be increased. Therefore, the user can see and operate more operation buttons at once. In the sub LV region 402, the size of the sub LV images is not changed. As a result, the user can perform an operation to select a sub LV image with the same operationality as when the LV region 401 is displayed.

In step S513, the control unit 301 displays the screen in which the LV region 401 is not displayed as illustrated in FIG. 6B similarly to step S512. Accordingly, when there is no LV image to be displayed in the LV region 401, an operation by the user for increasing the display area of the operation region 403 can be eliminated.

In step S514, the control unit 301 displays a text message 602 based on the condition determined in step S505. An example of a screen displaying a text message is illustrated in FIG. 6C. By this, the user can know the reason why the LV region 401 is not displayed and how to display the LV region 401. In the present embodiment, a text message is displayed, but an icon or an image based on the determined condition may be displayed.

In step S515, the control unit 301 determines whether or not an LV image has been acquired from the camera 200 that is the operation target, similarly to step S509. The determination as to whether or not an LV image has been acquired is performed using the same conditions as in step S506. The control unit 301, in a case where an LV image has been acquired, advances the process to step S516; otherwise the control unit 301 advances the process to step S521.

In step S516, similarly to step S507, the control unit 301 reads the display setting of the LV region from the work memory 304, and determines whether the LV region is set to be displayed or non-displayed. If the LV region is set to be displayed, the control unit 301 advances the process to step S517; if the LV region is set to be non-displayed, the control unit 301 advances the process to step S519.

In step S517, the control unit 301 displays a screen in which the LV region 401 is displayed.

In step S518, the control unit 301 displays an LV image from the camera 200 that is the operation target in the LV region 401.

In step S519, the control unit 301 displays the screen in which the LV region 401 is not displayed as illustrated in FIG. 6B similarly to step S512. Accordingly, when there is no LV image to be displayed in the LV region 401, an operation by the user for increasing the display area of the operation region 403 can be eliminated.

In step S520, the control unit 301 displays a text message 602 as illustrated in FIG. 6C based on the condition determined in step S506.

In step S521, the control unit 301 performs a process equivalent to step S519.

In step S522, the control unit 301 performs a process equivalent to step S520.

In step S523, the control unit 301 determines whether or not there has been a user operation on the display unit 306. The control unit 301, in a case where there was an operation, advances the process to step S524; when there was no operation, the control unit 301 returns the process to step S501.

In step S524, the control unit 301 transmits an event for operating the camera 200 to the camera 200 via the connection unit 311 or the public network connection unit 312 in response to the operation of the operation button displayed in the operation region 403. Then, the process returns to step S501.

As described above, according to the present embodiment, when an LV image cannot be acquired from the camera, the region for displaying LV image is not displayed, the region in which the operation buttons are arranged can be widened into that region, and thereby it is possible to more effectively utilize the display screen.

Also, when LV images cannot be acquired from the camera and the LV region is not required, it is possible to eliminate an operation for widening the region for operation buttons that the user can see.

Second Embodiment

Since the configurations of the communication system, the camera, and the control apparatus in the second embodiment are similar to those in FIG. 1 to FIG. 4 used to illustrate the first embodiment, description thereof will be omitted.

Figure 8:
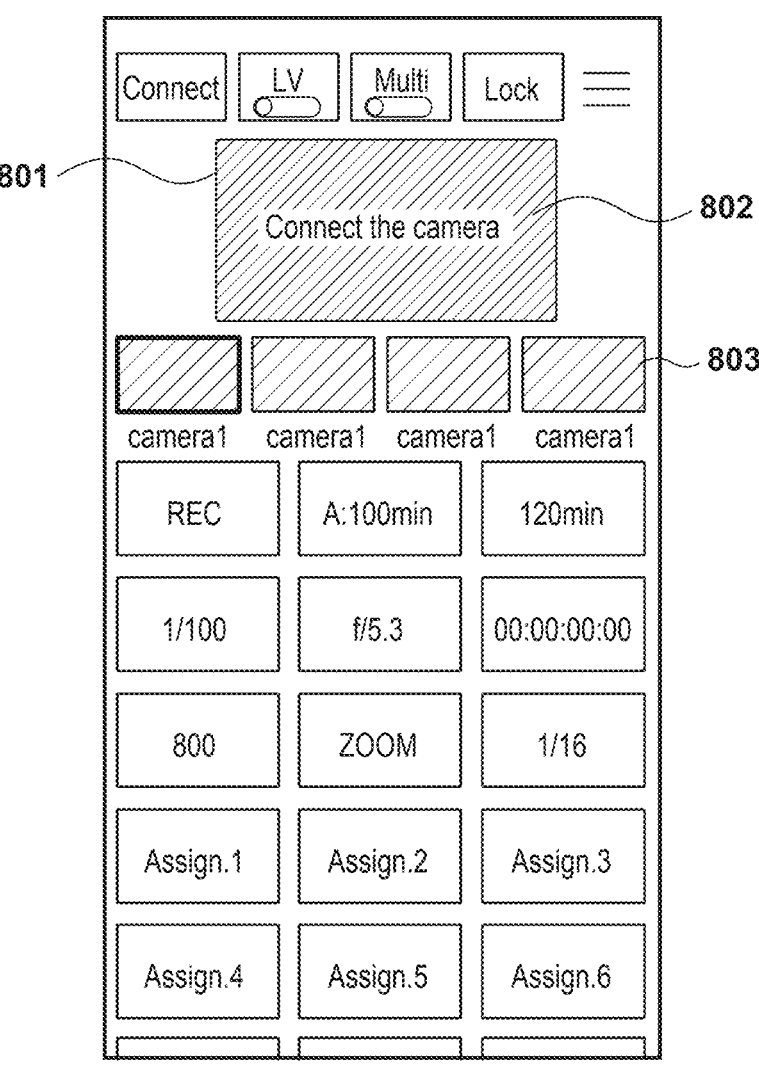
FIG. 8 is a view illustrating an example of a screen of the control apparatus in the second embodiment.

FIG. 7 is a flowchart illustrating overall operation of the control apparatus 300 in a second embodiment. The operation of the flowchart of FIG. 7 is realized by the control unit 301 loading a program recorded in the non-volatile memory 303 into the work memory 304 and executing the program. FIG. 8 will be described together with the flowchart of FIG. 7. In the flowchart of FIG. 7, steps for the same processing as that of FIGS. 5A and 5B are denoted by the same step numbers as those of FIGS. 5A and 5B, and description thereof will be omitted.

In step S701, the control unit 301 displays a screen in which the LV region 401 and the sub LV region 402 are displayed in a reduced size as illustrated in FIG. 8 (decreases the LV region 401). The reduced display allows the user to view and operate more operation buttons at a time, similarly to the effect described in step S512. In this screen, a black image 801 and a text message 802 based on the criteria determined in step S506 are displayed in the reduced LV region 401. Accordingly, the effect described in step S510 and step S514 can be obtained. Note that, although the sub LV region 402 is displayed in a reduced size as illustrated by a sub LV region 803, the display may be non-displayed, and the camera that is to be the operation target may be selected by a display object other than the sub LV region 402.

In step S702, the control unit 301 performs a process equivalent to step S701.

Also in the present embodiment, as in the first embodiment, it is possible to effectively utilize the display screen. Further, it is possible to omit an operation for widening the region for operation buttons.

Note that the control unit 301 may make the LV region non-displayed when the time over which LV images cannot be acquired continues for a predetermined time period. Also, the control unit 301 may switch the LV region from non-displayed to displayed when the time over which LV images have been acquired continues for a predetermined time period. According to such control, it is possible to suppress a degradation in visibility caused by repeated display/deletion of the LV region according to an LV image having been acquired and an LV image not having been acquired.

Also, the control unit 301 may display the LV region in a reduced size when the time over which LV images cannot be acquired continues for a predetermined time period. Also, the control unit 301 may switch the LV region to a normal display (display prior to reduction) from a reduced display when the time over which LV images have been acquired continues for a predetermined time period. By virtue of the above described control, it is possible to suppress a degradation in visibility caused by repeated magnification/reduction of the LV region according to an LV image having been acquired and an LV image not having been acquired.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-118519, filed Jul. 20, 2023, which is hereby incorporated by reference herein in its entirety.

What is claimed is:

1. A control apparatus, comprising:

at least one processor or circuit configured to function as:

an acquisition unit configured to acquire data from an external apparatus via a communication unit; and a generation unit configured to, based on the data acquired by the acquisition unit, generate a display screen including operation information which is information for operating the external apparatus, wherein the generation unit, based on whether a live view image is included in the data acquired by the acquisition unit, adjusts a first display region which is a display region for the live view image and a second display region which is a display region for the operation information in the display screen, and wherein the generation unit, in a case where the live view image is included in the data acquired by the acquisition unit, adjusts a size of the second display region to a first size, and in a case where the live view image is not included in the data, adjusts the size of the second display region to a second size larger than the first size, and deletes the first display region.

2. The control apparatus according to claim 1, wherein whether the live view image is acquired is determined based on whether the acquisition unit received the live view image.

3. The control apparatus according to claim 1, further comprising a display unit configured to display a display screen generated by the generation unit.

4. The control apparatus according to claim 3, wherein the control apparatus is operable to communicate with a plurality of the external apparatus.

5. The control apparatus according to claim 4, wherein the generation unit, in a case where any live view image of the plurality of the external apparatus is not included in a plurality of data acquired by the acquisition unit, deletes the first display region.

6. The control apparatus according to claim 4, wherein the display unit displays a live view image acquired from the plurality of the external apparatus on a third display region.

7. The control apparatus according to claim 6, wherein an external apparatus that is a target of operation by the control apparatus is decided by a selection of a live view image displayed on the third display region.

8. The control apparatus according to claim 7, wherein the generation unit, even in a case where the first display region has been deleted, does not delete the third display region.

9. The control apparatus according to claim 8, wherein the generation unit, in a case where the first display region is reduced, also reduces the third display region.

10. The control apparatus according to claim 1, wherein the operation information includes information for operating the external apparatus.

11. The control apparatus according to claim 1, wherein the external apparatus is an image capturing apparatus.

12. The control apparatus according to claim 11, wherein the live view image is acquired by image capturing by the image capturing apparatus.

13. The control apparatus according to claim 1, wherein the generation unit, when a time over which a live view image has not been included in the data continues for a predetermined time period, deletes the first display region.

14. A method of controlling a control apparatus, the method comprising:

acquiring data from an external apparatus via a communication unit; and based on the acquired data, generating a display screen including operation information which is information for operating the external apparatus, wherein in the generating, based on whether a live view image is included in the data acquired by the acquisition unit, a first display region which is a display region for the live view image and a second display region which is a display region for the operation information are adjusted in the display screen, and wherein in the generating, in a case where the live view image is included in the data acquired by the acquisition unit, a size of the second display region is adjusted to a first size, and in a case where the live view image is not included in the data, the size of the second display region is adjusted to a second size larger than the first size, and the first display region is deleted.

15. A non-transitory, computer-readable storage medium storing a program for causing a computer to function as each unit of a control apparatus, the control apparatus comprising:

an acquisition unit configured to acquire data from an external apparatus via a communication unit; and a generation unit configured to, based on the data acquired by the acquisition unit, generate a display screen including operation information which is information for operating the external apparatus, wherein in the generating, based on whether a live view image is included in the data acquired by the acquisition unit, a first display region which is a display region for the live view image and a second display region which is a display region for the operation information are adjusted in the display screen, and wherein in the generating, in a case where the live view image is included in the data acquired by the acquisition unit, a size of the second display region is adjusted to a first size, and in a case where the live view image is not included in the data, the size of the second display region is adjusted to a second size larger than the first size, and the first display region is deleted.

* * * * *